United States Patent [19]
Wiley

[11] Patent Number: 6,041,902
[45] Date of Patent: Mar. 28, 2000

[54] CONSTANT CLEARANCE SPRING CONE CLUTCH

[75] Inventor: Robert J. Wiley, Wichita, Kans.

[73] Assignee: Varatran, Inc., Wichita, Kans.

[21] Appl. No.: 09/189,620

[22] Filed: Nov. 9, 1998

[51] Int. Cl.[7] .............................. F16D 11/04; F16D 11/06
[52] U.S. Cl. ...................................... 192/66.22; 192/54.51
[58] Field of Search .............................. 192/48.7, 54.51, 192/66.2, 66.22; 74/126

[56] References Cited

U.S. PATENT DOCUMENTS

| | | |
|---|---|---|
| 451,727 | 5/1891 | Claussen . |
| 482,788 | 9/1892 | Davis . |
| 495,602 | 4/1893 | Shaw . |
| 1,228,411 | 6/1917 | Conner ................................ 192/66.22 |
| 1,235,940 | 8/1917 | Shipman . |
| 2,457,367 | 12/1948 | Hale ..................................... 192/66.22 |
| 2,465,054 | 3/1949 | Berg .................................... 192/66.2 X |
| 4,092,870 | 6/1978 | Giometti .......................... 192/54.51 X |
| 5,411,122 | 5/1995 | Uphaus . |
| 5,674,144 | 10/1997 | Wiley . |
| 5,722,510 | 3/1998 | Viale .................................. 192/66.2 X |

Primary Examiner—Charles A Marmor
Assistant Examiner—Roger Pang
Attorney, Agent, or Firm—Chase & Yakimo, L.C.

[57] ABSTRACT

A clutch assembly for transmitting power from an oscillating drive shaft to a driven mechanism includes a clutch member having a rotatable input component for receiving power from the oscillating drive shaft, a rotatable output component for transferring power to the driven mechanism and a spring mounted at one end to the input component and having an opposite end secured in a fixed position. The spring biases the input component into engagement with the output component upon rotation of the drive shaft in one direction and biases the input component toward the output component upon rotation of the drive shaft in an opposite direction. The assembly preferably includes a plurality of clutch members for sequentially transmitting power from a drive shaft to the driven mechanism to cause rotation thereof.

9 Claims, 3 Drawing Sheets

CONSTANT CLEARANCE SPRING CONE CLUTCH

FIELD OF THE INVENTION

This invention relates to a clutch assembly for transmitting power from an oscillating drive shaft to a driven mechanism. More specifically, whether locked up or rewinding, the clutch assembly maintains a minimum clearance between the input and output cones.

BACKGROUND OF THE INVENTION

Overrunning, backstop or one-way clutches describe clutches in which the output locks to the input when the input is rotated in one direction (i.e., the power stroke) and free-wheels when the input shaft is rotated in the opposite direction (i.e., the non-power stroke). A transmission that employs a continuously oscillating drive mechanism with which this type of clutch may be used is the Continuously Variable Ratio Transmission disclosed in U.S. Pat. No. 5,674,144 ("the '144 patent"), hereby incorporated herein by reference. There are primarily three types of these overrunning clutches, and each has disadvantages as described below.

A roller ramp clutch has compartmentalized ball or roller bearings placed around the input shaft. The compartment, being shaped like a ramp relative to the circumference of the shaft, is closer to the shaft at one end of the ramp and rises away from the shaft. The ramp acts as the inner race for the clutch. The outer race is a cylindrical unit that fits around the bearings, ramps and shaft. The clearance between the inside of this outer race and the bearings is small enough to allow the bearings to turn freely when they are at the end of the ramp closest to the input shaft. As a bearing rolls up its ramp and therefore moves further from the input shaft, the bearing comes into contact with the inner surface of the outer race and wedges between the ramp of the inner race and the surface of the outer race. Typically, a spring is used to bias the bearings toward the compression area between the ramp and the inner surface of the outer race.

In operation, as the shaft rotates in one direction, the bearings roll toward the end of the ramp closest to the shaft, where they are allowed to freely turn and the outer race free-wheels. When the input shaft rotation is reversed, the spring forces the bearings to make contact with the inner surface of the outer race, and the reversed rotary motion causes them to roll toward the compression end of the ramp. Once the bearings are wedged into the space between the ramp and inner surface of the outer race, they cannot rotate and they lock the outer race to the inner race. There can be as many as thirty or more parts in the typical roller ramp clutch.

Another type of overruning clutch, the sprag clutch, has an inner and outer race with the surfaces thereof being concentric with the input shaft. Sprags are placed in the area between these two surfaces. These sprags are metal blocks that are formed into a shape somewhat like a warped figure eight which, in cross section, is narrower when the clutch is freewheeling. When the rotation direction of the input shaft is reversed, these sprags pivot and wedge their larger cross-sections between the inner and outer race, providing lock-up. These sprags must butt up against each other around the entire circumference of the inner race, yet be allowed to pivot freely to lock-up. In most cases, a cage must be provided to keep constant alignment between the sprags, and there must be a spring surrounding the sprag assembly to keep equal tension on all of the sprags.

Both the roller ramp clutches and the sprag clutches require the wedging action necessary for lock-up to exert force primarily in an outward direction. This can cause distortion of the outer race if it is not of sufficient mass to remain rigid. Also in this regard with respect to the sprag clutches, high operating speeds on the sprag clutch and the resulting outward centrifugal force generated, may cause the sprags to lift off of the inner race, which prohibits lock-up. A higher spring biasing force must be used to compensate for this, but wear from the surfaces sliding against each other is increased, thereby limiting the service life.

Both of these types of clutches have very little actual surface contact between the bearings or sprags and the inner and outer races. This limited contact area reduces the capability of the clutch to transmit the torque from the input shaft to the outer race once the amount of friction achieved through this limited contact area is surpassed.

Additionally, for consistent operation of either of these types of clutches over multiple cycles, all bearings or sprags must engage at exactly the same time, which is difficult to achieve. Under high torque loads, if one bearing or sprag locks up before the others, failure occurs.

The third type of overruning clutch is a family of devices which all provide friction by compression. One of these devices is the conventional screw cone clutch. It includes an output cone rotatably mounted onto the input shaft and against a stop which maintains the output cone's placement on the shaft. The input cone is screwed onto the input shaft in a mating relationship with the output cone.

In operation, when locked up, the input cone is compressed against and rotates at the same speed as the output cone until the rotation direction of the input shaft is reversed. With the shaft's change in direction, the input cone is screwed away from the output cone. The input cone continues to rotate in the same direction as the output cone, however, until the friction from the output cone falls below the friction imparted on the input cone by the reverse rotation of the input shaft. It is the balance between these two forces that determines the clearance between the input and output cones. The inertia carried by the input cone moves it further away from the output cone that the final clearance distance. The torque required to change the direction of the input cone also tends to cause the input cone to move further away from the output cone until the two friction sources are balanced. At some rate of operation, the screw cone will not change its direction of rotation with the input shaft. Thus, the input cone must be rotated forward several additional degrees than a re normally necessary to achieve lock-up, resulting in additional rotation of the input shaft. At high speeds, conventional screw cone clutches may miss cycles resulting in decreased or no lock-up.

SUMMARY OF THE INVENTION

Accordingly, a primary object of the subject invention is to provide a clutch assembly for transmitting power from an oscillating drive shaft to a driven mechanism.

Another important object is to provide such a clutch assembly that includes a rotatable input cone for receiving power from the oscillating drive shaft, a rotatable output cone for transferring power to the driven mechanism and a spring which causes the input cone to engage and rotate the output cone upon rotation of the drive shaft in one direction and maintains a minimum clearance between the input cone and the output cone upon rotation of the drive shaft in the opposite direction.

Still another important object is to provide such a clutch assembly having the spring mounted at one end to the input cone and having an opposite end secured in a fixed position.

Yet another important object of the subject invention is to provide a clutch assembly including three clutches for sequentially transferring power from an oscillating drive shaft to the driven mechanism to effect rotation thereof.

Another object of the subject invention is to provide a clutch assembly for transmitting power from an oscillating drive shaft which includes an input component that is not overcome and controlled by its own inertia as the drive shaft moves it between rewind and lock-up, but is capable of achieving lock-up quickly even at high operating speeds.

Another object of the subject invention is to provide a clutch assembly that can withstand the transfer of a high amount of power from an oscillating drive shaft.

Yet another object of the subject invention is to provide a clutch assembly for transmitting power from an oscillating drive shaft that has long-term operation capability.

Other objects and advantages will become apparent as the description continues.

DETAILED DESCRIPTION OF THE PREFERRED EMBODIMENT

Figure 1:
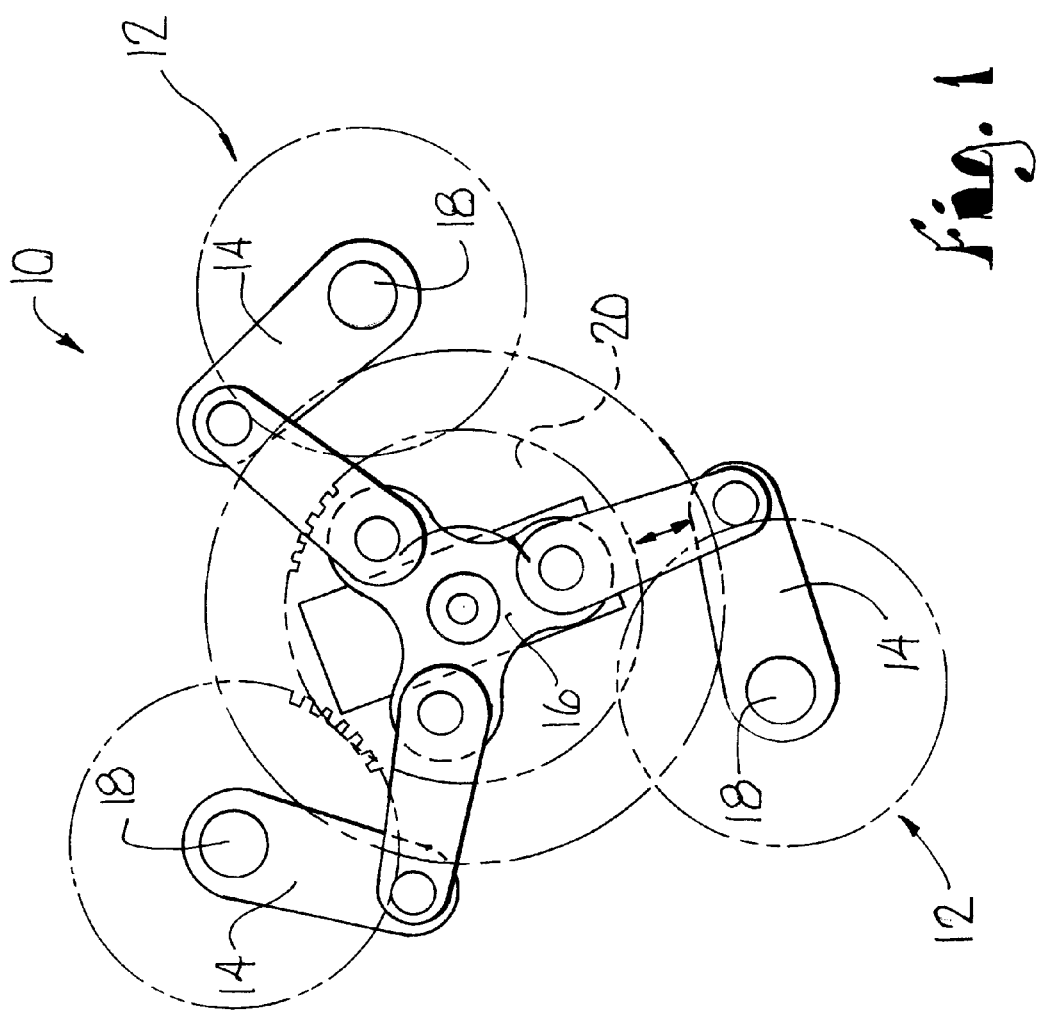
FIG. 1 is a front elevational view of the clutch assembly in accordance with the present invention, showing the output components thereof having crank arms secured thereto and coupled to a summing gear of a transmission.

A clutch assembly 10, in accordance with the present invention as shown in FIG. 1, includes three constant clearance spring clutches 12 rotatably connected to the crank arms 14 of center web member 16 by input shafts 18, respectively. Crank arms 14 cause the input shafts to oscillate and thereby power the clutches 12, which cause the summing gear 20 to rotate. Crank arms. 14, web member 16 and input shafts 18 are all parts of the drive mechanism, and the summing gear 20 represents the mechanism being driven. The Continuously Variable Ratio Transmission described in the '144 patent is one drive mechanism that may be used with the clutch assembly 10. It should be understood that clutches 12 are identical as are the input shafts 18, and although only one clutch 12 or shaft 18 may be described, the description applies to each of them.

Figure 2:
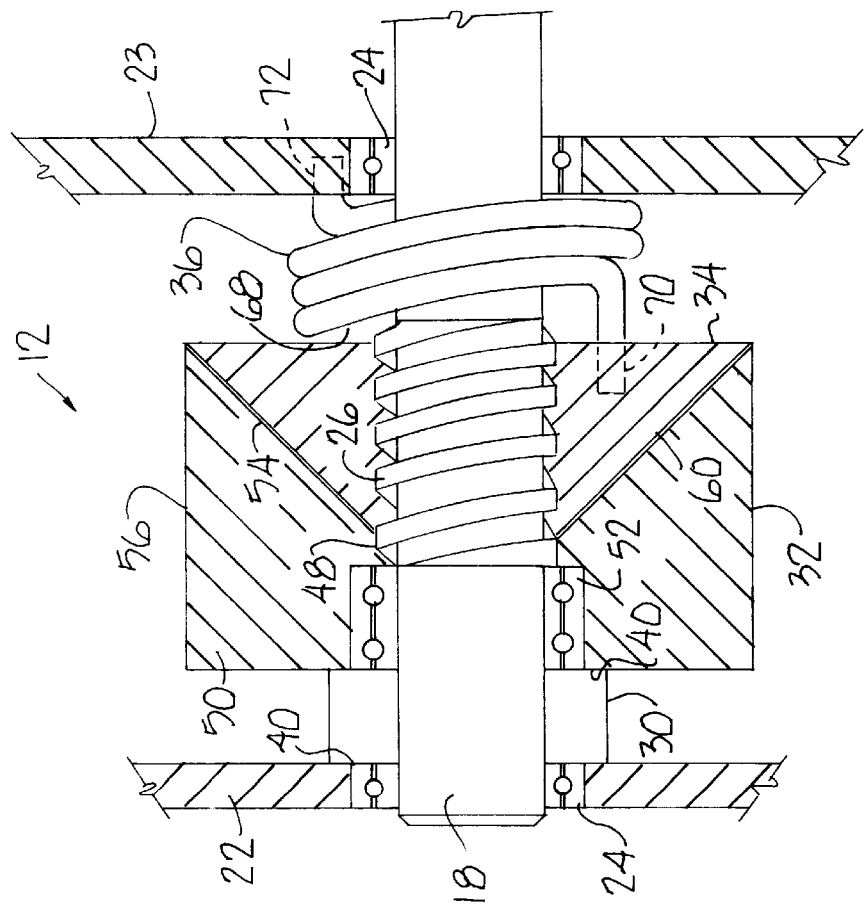
FIG. 2 is a sectional view of one of the clutches of FIG. 1 in the rewind position with the input shaft and spring shown in full and the summing gear and crank arm removed for clarity.
Figure 4:
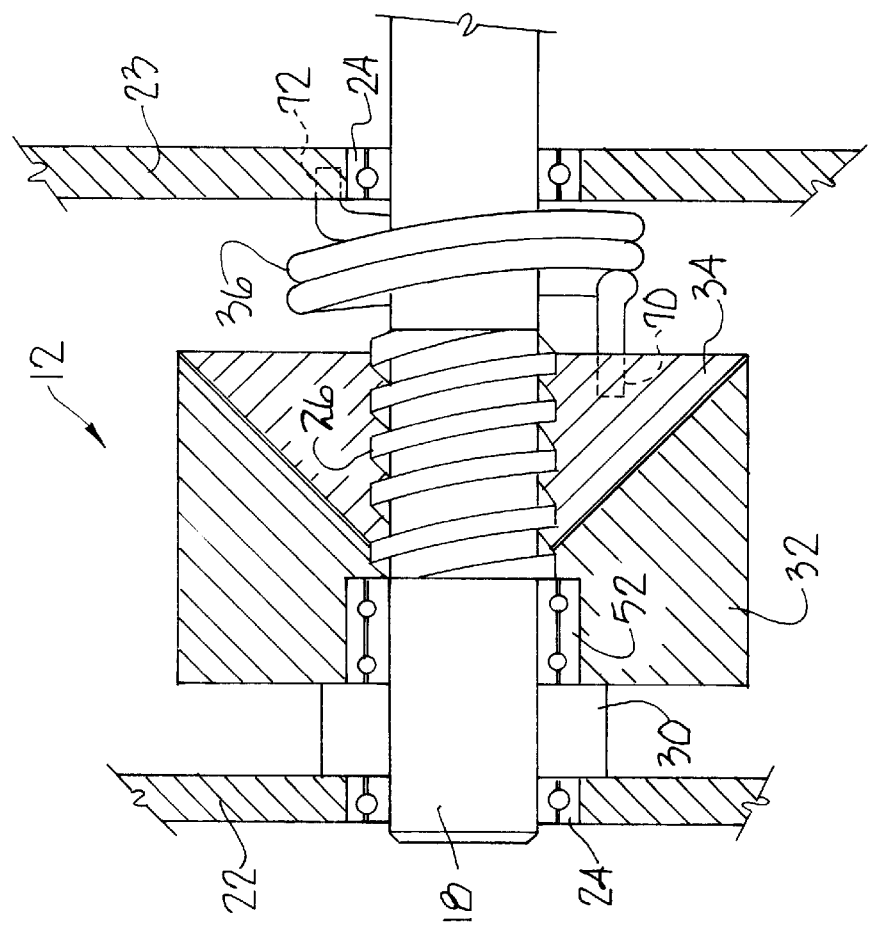
FIG. 4 is a sectional view of the clutch of FIG. 2 in the lock-up position with the input shaft and spring shown in full for clarity.

As seen in FIGS. 2 and 4, the input shaft 18 extends between spaced apart fixed chassis members 22 and 23 and is rotatably mounted thereto at bearings 24. The shaft 18 includes external threads 26 that extend therealong between the chassis members 22 and 23. Threads 26 are preferably relatively large to enable the shaft 18 to handle a large amount of torque.

Figure 3:
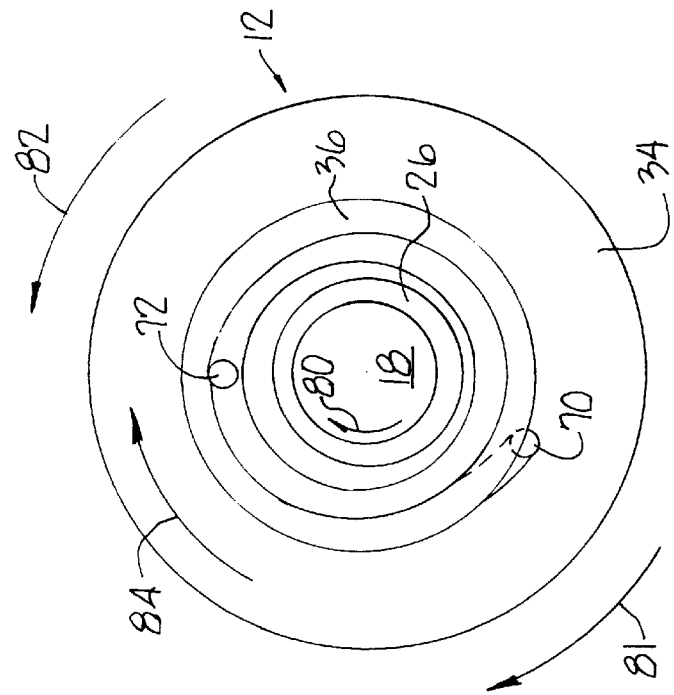
FIG. 3 is a front elevational view of the clutch of FIG. 2 with the chassis removed for clarity.
Figure 5:
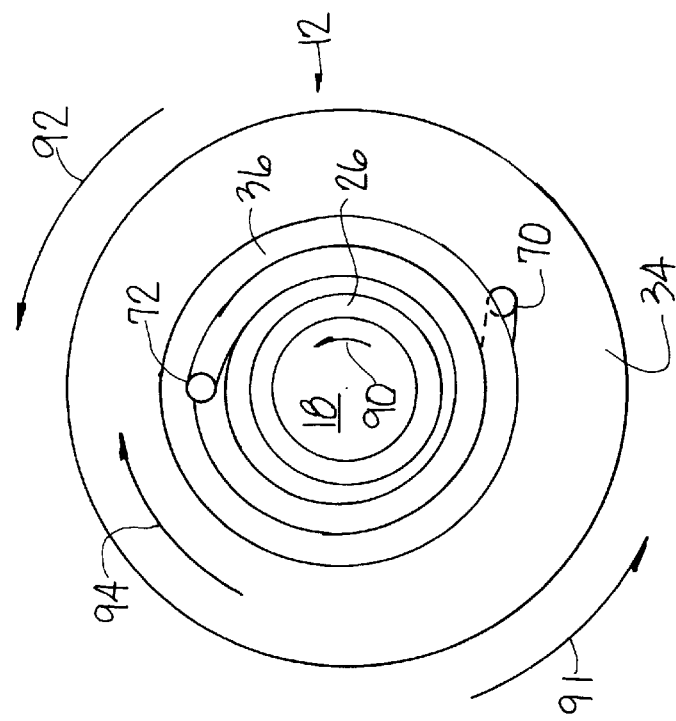
FIG. 5 is a front elevational view of the clutch of FIG. 4 with the chassis removed for clarity.

FIGS. 2 and 3 show a clutch 12 mounted on the input shaft 18 in its rewind position ("free-wheeling"), that is, during its non-power stroke. FIGS. 4 and 5 show the clutch 12 in its locked position ("lock-up"), that is, during its power stroke.

Clutch 12 includes stop member 30, output cone 32, input or screw cone 34 and clearance spring 36.

The stop member 30 is fixedly mounted to the input shaft 18, immediately adjacent the chassis member 22 and between both chassis members 22 and 23. The stop member 30 rotates with the input shaft 18. The rear surface 40 of the stop member 30 is immediately adjacent the chassis member 22, and the front surface 42 abuts the rear surface 50 of the output cone 32.

The output cone 32 includes a throughbore 48 through which the input shaft 18 extends. The output cone 32 is mounted thereto by thrust bearings 52 which allow the output cone 32 to freely rotate or free-wheel around the input shaft 18. The front surface of the output cone 32 presents a female wedge portion 54 and forms the inner race of the clutch 12. The circumferential side surface 56 of the output cone is provided with gear teeth for engagement with the summing gear 20, as seen in FIG. 1.

The input cone 34 is internally threaded for mounting to the input shaft 18 around its external threads 26. The rear of the input cone 34 presents a male wedge portion 60, which forms the outer race of the clutch 12. The angle at which the female and male wedge surfaces 54 and 60 extend is preferably identical.

The input shaft 18 extends through the passageway 68 of helical clearance spring 36, the spring 36 being mounted around the input shaft 18 between the input cone 34 and the chassis member 23. One end 70 of the spring 36 is fixedly mounted to the input cone 34, and the other end 72 of the spring 36 is fixedly mounted to the chassis member 23.

Operation

First, the operation of a clutch 12 will be discussed with reference to FIGS. 2–5. The input shaft 18 oscillates 310 degrees to move the clutch 12 between its rewind or free-wheeling position, FIGS. 2 and 3, and its lock-up position, FIGS. 4 and 5.

As the clutch 12 unwinds, shown in FIGS. 2 and 3, the input shaft's direction of rotation changes from counter-clockwise to clockwise, as shown by arrows 90 and 80 in FIGS. 5 and 3. The input cone 34 continues to rotate in the same direction as the output cone 32 (see arrows 91 and 92 in FIG. 5) until the friction from the output cone 32 falls below the friction imparted on the input cone 34 by the reverse rotation of the input shaft 18 (arrow 80 in FIG. 3). Also, the spring's bias, as shown by arrow 94 in FIG. 5, which is still opposite the direction of the input cone's rotation, dampens the inertia of the input cone 34.

Once the input cone's direction of rotation changes (arrow 81 in FIG. 3), the input cone 34 is screwed away and disengaged from the output cone 32 by the continued rotation of the output cone 32. However, the spring 36, which has coiled 310 degrees to strengthen its bias in the direction of arrow 84, maintains only a small clearance between the cones 32 and 34 at approximately 0.001 inch by forcing the input cone 34 toward the output cone 32. By maintaining this small clearance between the cones 32 and 34 and decreasing the amount of time before the input cone's direction of rotation is reversed, the spring 36 facilitates the transition from this free-wheeling position to lock-up, shown in FIG. 4.

In the rewind position, the output cone 32 rotates freely in the counter-clockwise direction, as shown by arrow 82 in FIG. 3.

In the lock-up position, shown in FIGS. 4 and 5, the shaft 18 changes its direction of rotation from clockwise to counter-clockwise, as shown by arrows 80 and 90 in FIGS. 3 and 5. The threads 26 on the shaft 18, as well as the action of the spring 36 as discussed above, force the input cone 34 to rotate with the shaft 18 and screw forward, into the female wedge portion 54 of the output cone 32. The output and input cones 32 and 34 are compressed with the male and female wedge portions 54 and 60 fully engaged. This causes the input cone 34 to rotate at the same speed and in the same direction as the output cone 32, as shown by arrows 91 and 92 in FIG. 5. The output cone 32 drives the driven mechanism, represented by the summing gear 20.

The spring 36 unwinds around the shaft 18 in the opposite direction thereof, as shown by arrow 84 in FIG. 3, but the spring 36 maintains its clockwise bias, as shown by arrow 94 of FIG. 5. The spring 36 thereby still aids in compressing the male wedge 60 of the input cone 34 into the female wedge 54 of the output cone 32.

The stop member 30 precludes the output cone 32 from moving along the shaft 18. This helps compress the cones 32 and 34 and thus achieve lock-up.

Lock-up continues until the shaft 18 changes its direction of rotation from counter-clockwise, as in FIG. 5, to clockwise, as in FIG. 3. The cycle then begins again.

Now the operation of the clutch assembly 10, as shown in FIG. 1 will be discussed. Three clutches 12 are shown as making up the continuously oscillating drive mechanism. However, it should be understood that any number may be employed as needed.

Each individual clutch 12 operates as discussed above in sequence or in overlap with the other clutches 12 to impart rotary motion on the summing gear 20. That is, as one clutch 12 finishes its power stroke and achieves lock-up, at which point that clutch 12 ratchets the summing gear some distance, the next sequential clutch 12 begins its power stroke and so on. In this manner, the clutches 12, acting together, effect constant rotation to the summing gear 20, and the clutch assembly 10 overcomes the disadvantages of conventional sprag, roller ramp and screw cone clutches.

Having thus described the invention, what is claimed as new and desired to be secured by Letters Patent is as follows:

1. A clutch assembly for transmitting power from an oscillating drive shaft to a driven mechanism, comprising:
    a clutch member, including:
        a rotatable input component for receiving power from the oscillating drive shaft;
        a rotatable output component for transferring power to the driven mechanism:
        means for biasing said input component into engagement with said output component upon rotation of the drive shaft in one direction and for biasing said input component toward said output component upon rotation of the drive shaft in an opposite direction:
        said means for biasing being mounted at one end to said input component and having an opposite end secured in a fixed position;
        said assembly including a plurality of said clutch members for sequentially transmitting power from the drive shaft to the driven mechanism to cause rotation thereof.

2. A clutch assembly as claimed in claim 1 wherein said assembly includes three of said clutch members.

3. A clutch assembly as claimed in claim 1 wherein said opposite end of said means for biasing is attached to a chassis of said driven mechanism.

4. A clutch assembly for transmitting power from an oscillating drive shaft to a driven mechanism comprising:
    a clutch member, including:
        a rotatable input component for receiving power from the oscillating drive shaft;
        a rotatable output component for transferring power to the driven mechanism;
        means for biasing said input component into engagement with said output component upon rotation of the drive shaft in one direction and for biasing said input component toward said output component upon rotation of the drive shaft in an opposite direction;
        said means for biasing being mounted at one end to said input component and having an opposite end secured in a fixed position;
        said means for biasing being a spring mounted around said drive shaft.

5. A clutch assembly for transmitting power from an oscillating drive shaft to a driven mechanism, comprising:
    a clutch member, including:
        an input component for oscillating in opposite directions of rotation between a rewind position and a lock-up position, upon receiving power from the oscillating drive shaft;
        an output component rotatable in one of said directions of rotation, for transferring power to the driven mechanism;
        means for biasing said input component toward said output component and in a direction of rotation opposite said one direction of rotation of said output component;
        said means for biasing being mounted at one end to said input component and having an opposite end secured in a fixed position;
        said clutch member including a plurality of said clutch members for sequentially transmitting power from a drive shaft to the driven mechanism to cause rotation thereof.

6. A clutch assembly as claimed in claim 5 wherein said means for biasing biases said input component into engagement with said output component in said lock-up position.

7. A clutch assembly as claimed in claim 5 wherein said clutch assembly includes three of said clutch members.

8. A clutch assembly as claimed in claim 5 wherein said biasing means is a spring mounted around said drive shaft.

9. A clutch assembly as claimed in claim 5 wherein said opposite end of said means for biasing is attached to a chassis of driven mechanism.

* * * * *